(12) United States Patent
Smith (10) Patent No.: US 12,128,789 B2
(45) Date of Patent: *Oct. 29, 2024

(54) DEVICES, SYSTEMS, AND METHODS FOR MITIGATING VEHICLE POWER LOSS IN BATTERY MODE

(71) Applicant: ARGO AI, LLC, Pittsburgh, PA (US)

(72) Inventor: Joshua S. Smith, Livonia, MI (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,513

(22) Filed: Apr. 17, 2023

(65) Prior Publication Data

US 2023/0249578 A1 Aug. 10, 2023

Related U.S. Application Data

(63) Continuation of application No. 17/083,836, filed on Oct. 29, 2020, now Pat. No. 11,628,740.

(51) Int. Cl.
*H02J 7/00* (2006.01)
*B60L 58/10* (2019.01)
*H02J 7/14* (2006.01)

(52) U.S. Cl.
CPC ......... *B60L 58/10* (2019.02); *B60L 2240/547* (2013.01)

(58) Field of Classification Search
CPC ............................ B60L 58/10; B60L 2240/547
USPC .......................................................... 320/109
See application file for complete search history.

(56) References Cited

U.S. PATENT DOCUMENTS

| 7,166,986 | B2 | 1/2007 | Kendall | |
|---|---|---|---|---|
| 7,956,490 | B2 | 6/2011 | Sotnikow et al. | |
| 8,493,022 | B2* | 7/2013 | Bertness | H02J 7/00047 340/636.21 |
| 8,624,426 | B2* | 1/2014 | Kato | B60W 20/13 307/115 |
| 9,597,963 | B2 | 3/2017 | Slosarczyk et al. | |
| 9,744,858 | B2* | 8/2017 | Hall | H02J 50/12 |

(Continued)

FOREIGN PATENT DOCUMENTS

JP H09261861 10/1997
KR 10-1501873 B1 3/2015

(Continued)

OTHER PUBLICATIONS

International Search Report and Written Opinion of the International Searching Authority directed to related International Application No. PCT/US2021/057103, mailed on Feb. 14, 2022, 10 pages.

(Continued)

*Primary Examiner* — Alexis B Pacheco
(74) *Attorney, Agent, or Firm* — Sterne, Kessler, Goldstein & Fox P.L.L.C.

(57) ABSTRACT

Devices, systems, and methods are provided for mitigating vehicle power loss. A vehicle charging system may include a power supply, and a voltage control device associated with receiving first voltage from the power supply, providing the first voltage to a hybrid vehicle or a battery electric vehicle, and blocking a second voltage from the hybrid vehicle or the battery electric vehicle, wherein the vehicle charging system is external to the hybrid vehicle or the battery electric vehicle.

17 Claims, 4 Drawing Sheets

(56) References Cited

U.S. PATENT DOCUMENTS

| | | |
|---|---|---|
| 9,973,134 B1 | 5/2018 | Namuduri et al. |
| 10,211,444 B2 | 2/2019 | Dekeuster et al. |
| 10,351,238 B2 | 7/2019 | McAdoo |
| 11,628,740 B2 * | 4/2023 | Smith .................. B60L 53/305 |
| | | 320/109 |
| 2015/0069960 A1 * | 3/2015 | Kuraishi ................ H02J 7/342 |
| | | 320/107 |
| 2015/0306964 A1 * | 10/2015 | Wang ..................... H02J 7/342 |
| | | 320/162 |
| 2017/0170719 A1 | 6/2017 | Bang |
| 2018/0236888 A1 * | 8/2018 | Yabuuchi ............. H01M 10/44 |
| 2020/0177010 A1 | 6/2020 | Tamoto |
| 2020/0227761 A1 | 7/2020 | Yoshida |
| 2020/0282857 A1 | 9/2020 | Mortensen et al. |
| 2020/0395776 A1 | 12/2020 | Nedjimi et al. |
| 2021/0006073 A1 | 1/2021 | Donahue et al. |
| 2021/0086655 A1 | 3/2021 | Li et al. |

FOREIGN PATENT DOCUMENTS

| | | |
|---|---|---|
| KR | 10-2017-0070889 A | 6/2017 |
| KR | 10-2017-0073150 A | 6/2017 |

OTHER PUBLICATIONS

Yoo et al., "System Integration and Power-Flow Management for a Series Hybrid Electric Vehicle Using Supercapacitors and Batteries", IEEE Transactions on Industry Applications, Jan. 22, 2008, pp. 108-114, vol. 44, issue 1, IEEE, New York, NY.

Meissner et al., "Battery Monitoring and Electrical Energy Management: Precondition for Future Vehicle Electric Power Systems", Journal of Power Sources, Jul. 1, 2003, pp. 79-98, vol. 116, issue 1-2, Elsevier Science B.V., The Netherlands.

\* cited by examiner

DEVICES, SYSTEMS, AND METHODS FOR MITIGATING VEHICLE POWER LOSS IN BATTERY MODE

RELATED APPLICATION

This application is a continuation of U.S. patent application Ser. No. 17/083,836, filed Oct. 29, 2020, now pending, and is incorporated by reference in its entirety.

TECHNICAL FIELD

This disclosure generally relates to systems, methods, and devices for mitigating vehicle power loss.

BACKGROUND

Some vehicles are equipped with one or more batteries that may be charged by an external power source when a vehicle is not running. However, use of some external power sources used to supply power to a battery that powers a vehicle's computer may result in electrical current backfeeding and vehicle power loss.

There is therefore a need for a way to mitigate vehicle power loss.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Some vehicles operate on battery power. For example, electric vehicles and some hybrid vehicles may have a high voltage battery to provide power to a vehicle's components, an a direct current DC/DC converter to convert high-voltage power from the high voltage battery to lower voltage to power a vehicle's computer. Some vehicles allow for battery charging using shore power while the vehicles are not running. Unlike battery hybrid electric vehicles (or, more generally, vehicles with a high-voltage battery but without shore power), plug-in hybrid vehicles and electric vehicles may be able to maintain power to all systems off of shore power (e.g., by using a vehicle charging port). Therefore, battery hybrid electric vehicles may benefit from enhanced power loss mitigation.

Specifically, when a battery hybrid electric vehicle is not running, the vehicle's computers may not be able to run, which may prevent some applications such as offloading data from the vehicle while the vehicle is idle. In addition, the DC/DC converter may not be designed to support external power charges. In particular, when an external power supply is connected to a vehicle computer's low-voltage power domain while the vehicle is running, the voltage from the vehicle's DC/DC converter may "backfeed" to the external power supply, resulting in power supply failure and potentially vehicle power loss. Some power supplies with low impedance, for example, are not designed to operate concurrently with other power supplies, such as a vehicle's high voltage power supply, and may allow for backfeeding.

Therefore, enhanced systems, devices, and methods for mitigating power loss for lower voltage power domains used by battery hybrid electric vehicle computers may be beneficial.

Example embodiments described herein provide certain systems, methods, and devices for enhanced systems, devices, and methods for mitigating battery hybrid electric vehicle power loss and maintaining a battery hybrid electric vehicle computer's low-voltage power domain.

In one or more embodiments, enhanced systems, devices, and methods for mitigating vehicle power loss and maintaining a battery hybrid electric vehicle computer's low-voltage power domain may provide an alternative to vehicle shore power while a vehicle is not running. A battery hybrid electric vehicle's computer power domain may be powered indefinitely by an external high-power voltage maintainer (e.g., battery powered or plugged into a power receptacle), allowing a vehicle with a separate high voltage power supply (e.g., separate from the lower voltage power domain of the vehicle computers) to maintain operation of vehicle computer's low-voltage power domain even while the vehicle is not running. The high-power voltage maintainer may use a voltage control device (e.g., a diode, relay monitor circuit, etc.) to automatically disconnect the high-power voltage maintainer to the vehicle when the vehicle's power net voltage exceeds the power supply output (e.g., a power threshold). When the vehicle's power net voltage drops below the high-power voltage maintainer's output, the external high-power voltage maintainer's voltage control device may conduct to provide power to the vehicle, allowing the vehicle's lower powered battery to maintain the necessary voltage to power vehicle computers.

In one or more embodiments, the voltage control device of the external high-power voltage maintainer may prevent backfeeding. When the battery hybrid electric vehicle is on and charging using an external power supply, the converted voltage from the DC/DC converter of the vehicle may, without the voltage control device, backfeed into the external power supply, resulting in power supply failure and potentially vehicle power loss. However, the voltage control device of the high-power voltage maintainer may block (e.g., prevent flow of) current from the converted voltage (e.g., by disconnecting from the vehicle) when the vehicle battery voltage exceeds a threshold voltage, providing power loss mitigation and power supply maintenance. When the vehicle battery voltage drops below the threshold voltage, the voltage control device may connect to the vehicle battery to provide power to the vehicle's computers.

In one or more embodiments, the external high-power voltage maintainer may include one or more communication interfaces, such as cellular, Wi-Fi, Bluetooth, LTE, and the like, allowing for wired or wireless communications using the external power supply. For example, the communications interface may allow for offloading data from the vehicle's computers and/or other systems. In this manner, the external high-power voltage maintainer may receive data from the vehicle, and may send the data (e.g., to another device/system) using the one or more communication interfaces, thereby allowing for offloading of vehicle data without idling the vehicle.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
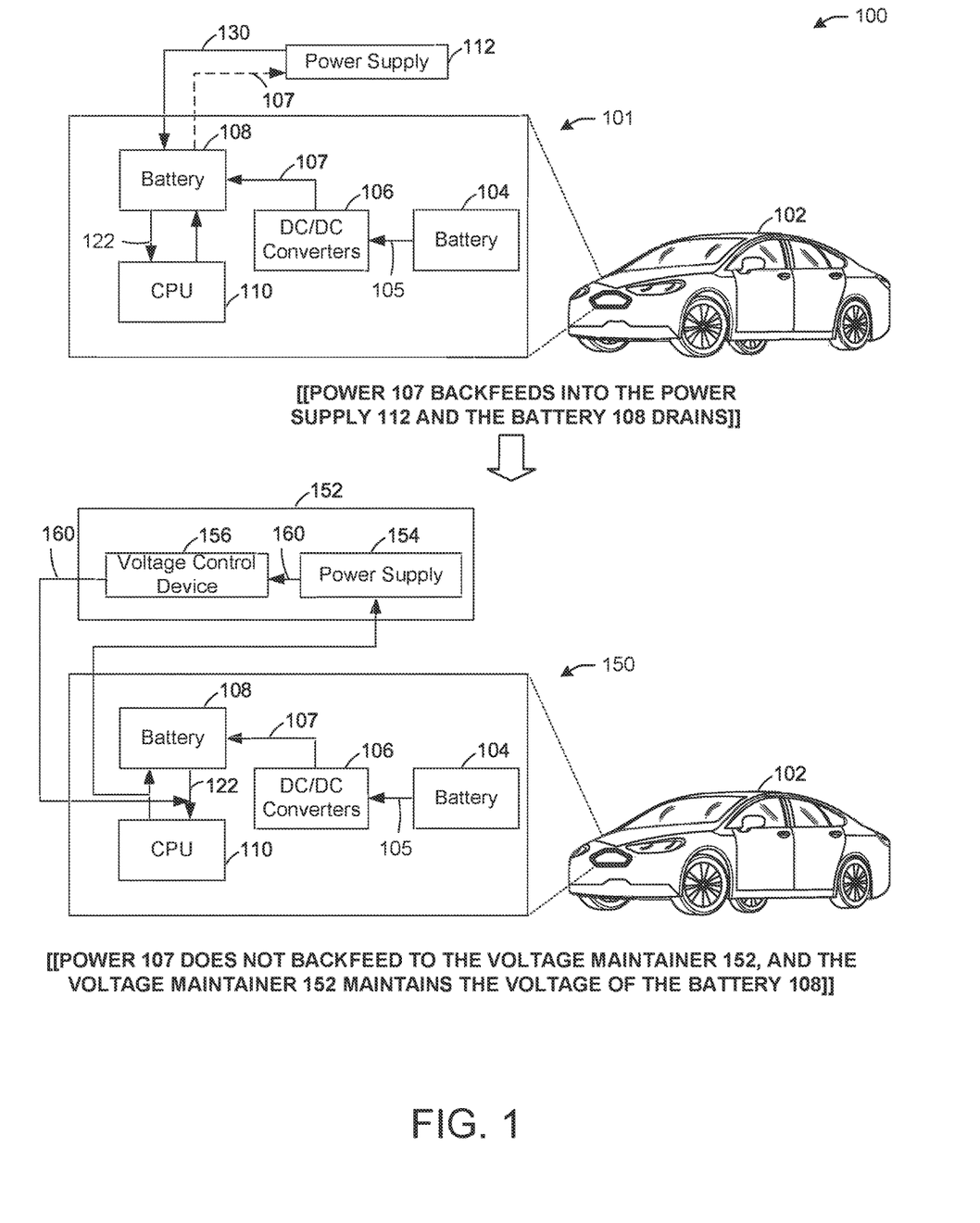
FIG. 1 depicts an illustrative schematic diagram for a vehicle, in accordance with one or more example embodiments of the present disclosure.

FIG. 1 depicts an illustrative schematic diagram 100 for a vehicle 102, in accordance with one or more example embodiments of the present disclosure.

Referring to FIG. 1, there is shown a vehicle 102 (e.g., a battery hybrid electric vehicle), which at step 101 may include a high voltage battery 104 that powers the vehicle 102 with power 105, one or more DC/DC converters 106 for converting the power 105 to a lower voltage power 107 that charges a lower voltage battery 108 (e.g., a 12 volt battery) used to power a computer (CPU) 110 of the vehicle 102. The vehicle 102 may be connected to an external power supply 112, which may provide power 130 to charge the battery 108. However, when the external power supply 112 is connected to the vehicle 102 while the vehicle 102 is running, the power 107 (e.g., current) may backfeed into the external power supply 112, resulting in vehicle power loss and/or power supply failure.

Still referring to FIG. 1, the battery 108 may output the power 107 to the computer 110 via a voltage output 122. At step 101, when the power 107 backfeeds from the battery 108, the battery 108 may lose power, and the power output by the battery 108 using the voltage output 122 (e.g., to the computer 110) may drop below the voltage supplied by the battery 108 (e.g., 12 volts), so the battery 108 may not provide sufficient power to operate the computer 110. However, at step 150, the power supplied by the battery 108 via the voltage output 122 may remain at 12 volts unless the vehicle is turned off (e.g., thereby eliminating the power 107 supplied to the battery 108 from the DC/DC converter 106). Because the voltage control device 156 may be operatively connected to the battery 108 (e.g., via the voltage output 122), the voltage control device 156 may detect the voltage output by the battery 108. When the voltage across the voltage control device 156 is negative (e.g., due to the power 107 backfeeding from the vehicle 102), the voltage control device 156 may prevent the flow of current. When the voltage across the voltage control device 156 is positive (e.g., when the vehicle 102 is turned off and the battery 108 drains below a threshold voltage), the voltage control device 156 may conduct, allowing the power 160 of step 150 to be provided to the vehicle 102.

Figure 2:
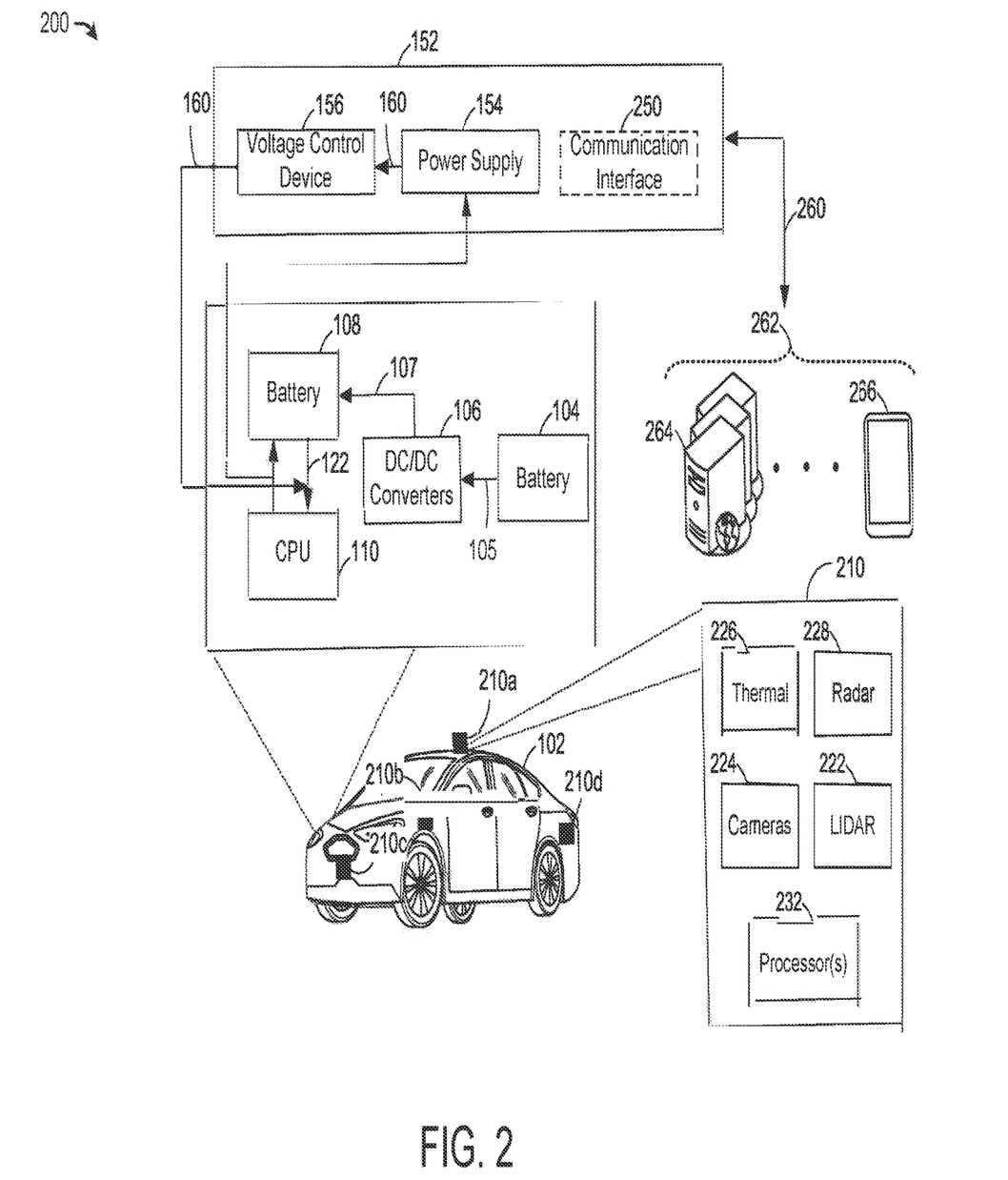
FIG. 2 depicts an illustrative schematic diagram for the vehicle of FIG. 1, in accordance with one or more example embodiments of the present disclosure.

Still referring to FIG. 2, at step 150, the vehicle 102 may be connected to an external high-power voltage maintainer 152 different than the external power supply 112 of step 101. The external high-power voltage maintainer 152 may include a power supply 154 (e.g., a battery or power provided from another source, such as a power receptacle to which the external high-power voltage maintainer 152 may connect). The power supply 154 may provide power 160 to a voltage control device 156 (e.g., a diode, a relay monitor circuit, or the like), which may turn on and conduct when the battery 108 of the vehicle 102 drops below a threshold voltage (e.g., 12 volts, such as when the vehicle 102 is off), allowing the power 160 to be provided to the vehicle 102. In addition, the voltage control device 156 may block the power 107 of step 101 from backfeeding into the external high-power voltage maintainer 152, maintaining power supply for the computer 110 and mitigating power loss of the vehicle 102 (e.g., when the vehicle 102 is on).

For example, when the voltage control device 156 includes a diode, the diode may conduct current in one direction (e.g., from the voltage control device 156 to the vehicle 102), preventing current (e.g., for the power 107) from backfeeding in the reverse direction (e.g., from the vehicle 102 to the external high-power voltage maintainer 152). When the voltage control device 156 includes a relay monitoring circuit (or device), the voltage control device 156 may detect when backfeeding current exceeds a threshold limit, and may stop conducting to prevent the backfeeding. In this manner, the voltage control device 156 may prevent the power 107 from backfeeding, may maintain the necessary voltage of the battery 108 to power the vehicle 102 computer 110, thereby mitigating the vehicle 102 power loss of step 101.

It is understood that the above descriptions are for purposes of illustration and are not meant to be limiting.

FIG. 2 depicts an illustrative schematic diagram 200 for the vehicle 102 of FIG. 1, in accordance with one or more example embodiments of the present disclosure.

Referring to FIG. 2, the vehicle 102 may have the features described at step 150 of FIG. 1, and also may include additional features. For example, the vehicle 102 may have a sensor system 210 for a plurality of cameras, emitters, and sensors. The sensor system 210 may be connected to the vehicle 202. The sensor system 210 may include sensors such as sensors 210a, 210b, 210c, and 210d. It should be noted that other sensors not shown in this figure may also be attached to the vehicle 202 and that the sensors 210a, 210b, 210c, and 210d are used for illustrative purposes. These sensors may detect objects in the vicinity and around the vehicle 102. Other emitters and sensors in the sensor system 210 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 210 may include LIDAR 222 (e.g., LIDAR emitters and sensors/receivers). Some examples of a LIDAR may include Geiger mode LIDAR, line-mode LIDAR, large footprint LIDAR, small footprint LIDAR, or the like. The sensor system 210 may include cameras 224 such as stereo cameras that may capture images in the vicinity of the vehicle 102. The sensor system 210 may include a thermal sensor 226, such as thermistors, resistance temperature detectors, thermocouples, semiconductors, or the like. Further, the sensor system may include a radar 228, which may be any radar that uses radio waves to capture data from objects surrounding the vehicle 102. The sensor system 210 may also include one or more processors 232. The one or more processors 232 may control the transmission and reception of signals using the LIDAR 222, the cameras 224, the thermal sensor 226, and the radar 228. The various sensors of the sensor system 210, when calibrated correctly, should indicate a proper distance and shape of an object.

In one or more embodiments, the external high-power voltage maintainer 152 of FIG. 1 may include the power supply 154, the voltage control device 156, and optionally a communication interface 250. The communication interface 250 may use one or more communication protocols such as cellular, Wi-Fi, Bluetooth, LTE, and the like, allowing for wired or wireless communications using the external power supply. For example, the communications interface 250 may allow for offloading data from the vehicle's computer 110 and/or other systems. In particular, the external high-power voltage maintainer 152 may send data 260 to one or more devices 262 (e.g., device 264, device 266). For example, the data 260 may include sensor data for the sensors of the sensor system 210, allowing the one or more devices 262 to analyze operational performance of the vehicle 102 and the sensor system 210 (e.g., whether the sensors satisfy performance metrics, etc.).

In one or more embodiments, the communication interface 250 may include wired or wireless network interfaces to enable communication with external networks. In some such examples, the communication interface 250 includes hardware (e.g., processors, memory, storage, antenna, etc.) and software that communicate via cellular networks (Global System for Mobile Communications (GSM), Universal Mobile Telecommunications System (UMTS), Long Term Evolution (LTE), Code Division Multiple Access (CDMA), etc.), wireless local area networks (WLAN) (including IEEE 802.11 a/b/g/n/ac or others, dedicated short range communication (DSRC), visible light communication (Li-Fi), etc.), and/or wide area networks (Wireless Gigabit (IEEE 802.11ad), etc.). In some examples, the communication interface 250 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the external high-power voltage maintainer 152 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

In one or more embodiments, the computer 110 and/or the one or more processors 232 may control various subsystems of the vehicle 102. For example, the computer 110 and/or the one or more processors 232 may control power windows, power locks, an immobilizer system, and/or power mirrors, etc. The computer 110 and/or the one or more processors 232 may include circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc.

In one or more embodiments, the computer 110 and/or the one or more processors 232 may control autonomous functions of the vehicle 102. More specifically, the computer 110 and/or the one or more processors 232 may include a system to autonomously park and un-park a vehicle 102 when an operator is outside of the vehicle, to cause acceleration or deceleration, to change directions, and the like.

The one or more devices 262 may include any suitable processor-driven device including, but not limited to, a mobile device or a non-mobile, e.g., a static, device. For example, the one or more devices 262 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically compass-able computing (DCC), a context-aware device, a video device, an audio device, or the like. It is understood that the above is a list of devices.

In one or more embodiments, the vehicle 102 may be an electric vehicle or a battery-powered hybrid vehicle. For example, instead of or in addition to an internal combustion engine, the vehicle 102 may use an electric motor powered by the high voltage battery 104. The vehicle 102 may be any suitable vehicle such as a motorcycle, a car, a truck, a recreational vehicle (RV), a boat, plane, and/or the like, and may be equipped with suitable hardware and software that enables it to communicate over a network, such as a local area network (LAN) or a wide area network (WAN). In one embodiment, the vehicle 102 may include an autonomous vehicle (AV). In one embodiment, the sensor system 210, the external high-power voltage maintainer 152, and/or other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards and/or the like).

Autonomous vehicle operation, including propulsion, steering, braking, navigation, and the like, may be controlled autonomously by the computer 110 and/or the one or more processors 232. For example, the computer 110 and/or the one or more processors 232 may be configured to receive feedback from one or more sensors (e.g., the sensor system 210, etc.) and other vehicle components to determine road conditions, vehicle positioning, and so forth. The computer 110 and/or the one or more processors 232 may also ingest data from the speed monitor and yaw sensor, as well as the tires, brakes, motor, and other vehicle components. The computer 110 and/or the one or more processors 232 may use the feedback and the route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth. The computer 110 and/or the one or more processors 232 may be configured to process received data, and may be configured to interact with the user via the user interface devices in the vehicle 102 and/or by communicating with the user's user device.

It is understood that the above descriptions are for purposes of illustration and are not meant to be limiting.

Figure 3:
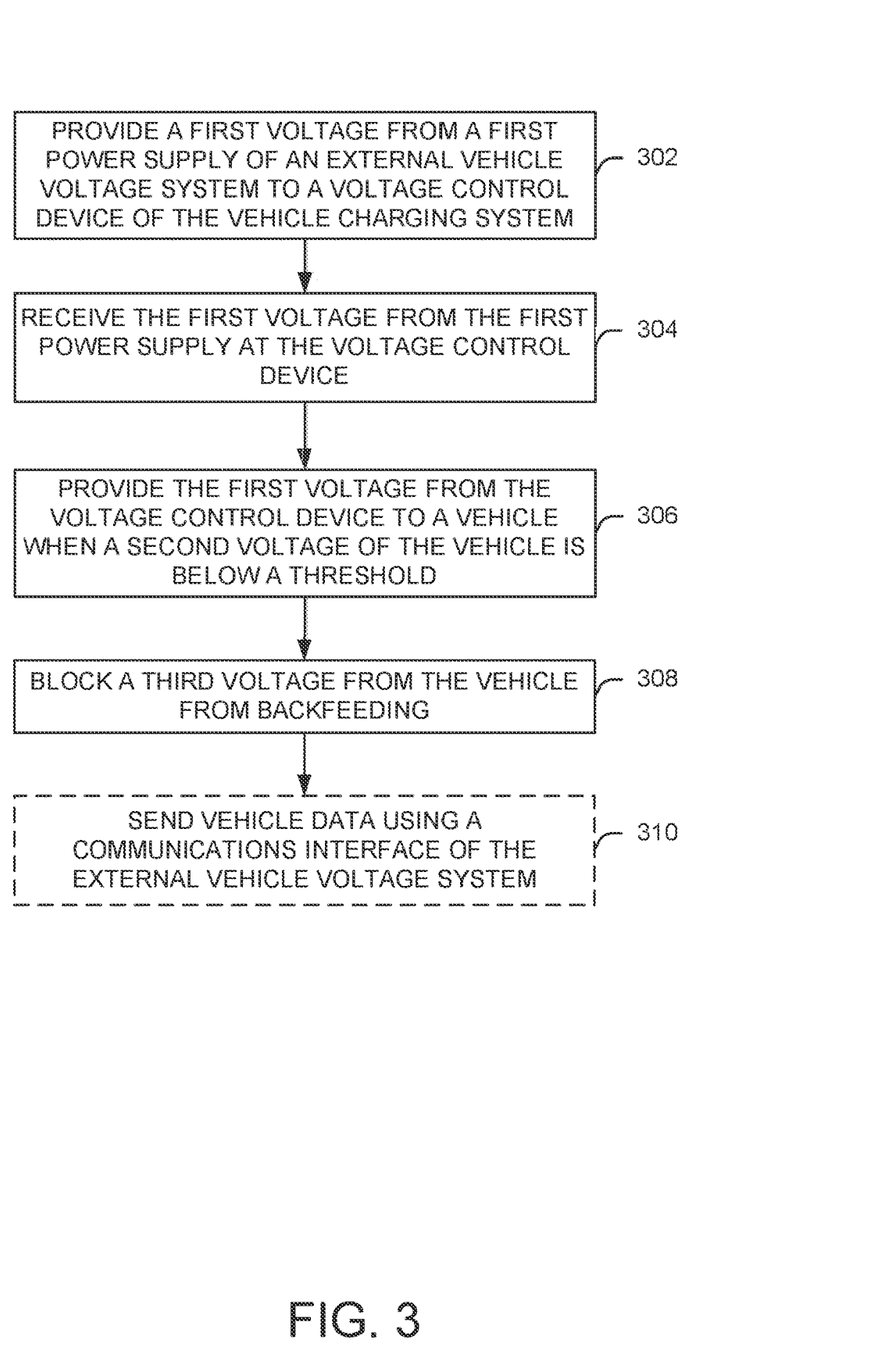
FIG. 3 illustrates a flow diagram of a process for mitigating vehicle power loss, in accordance with one or more example embodiments of the present disclosure.

FIG. 3 illustrates a flow diagram of a process 300 for mitigating vehicle power loss, in accordance with one or more example embodiments of the present disclosure.

At block 302, a vehicle voltage system (or device, e.g., the external high-power voltage maintainer 152 of FIG. 1 and FIG. 2) may provide a first voltage (e.g., for the power 160 of FIG. 1 and FIG. 2) to a voltage control device (e.g., the voltage control device 156) of the system. For example, a power supply of the system (e.g., a battery, power receptacle, etc.) may provide the first voltage to the voltage control device, which may be operatively connected to the power supply and to a vehicle (e.g., the vehicle 102) to provide the first voltage to the vehicle (e.g., to the battery 108 of FIG. 1 and FIG. 2). The system may be external to and detachable from the vehicle.

At block 304, the voltage control device of the vehicle voltage system may receive the first voltage from the power supply. Because the voltage control device may conduct in one direction (e.g., from the system to a vehicle), the first voltage may be provided to the vehicle when the voltage of a vehicle battery drops below a threshold voltage (e.g., a voltage needed to power a vehicle computer). The voltage control device may include a diode, relay monitor circuit, or other device for ensuring the flow of current in one direction (e.g., to prevent backfeeding to the power supply).

At block 306, the voltage control device of the vehicle voltage system may provide the first voltage to the vehicle when a second voltage of the vehicle is below a threshold voltage (e.g., to operate the computer 110 of FIG. 1 and FIG. 2). The voltage control device of the system may detect when the voltage of a vehicle battery drops below a threshold voltage because, for example, the voltage control device of the system may be operatively connected to the voltage output of the vehicle battery. Because the voltage control device may be operatively connected to the vehicle battery (e.g., via the voltage output 122 of FIG. 1 and FIG. 2), the voltage control device may detect the voltage output by the battery. When the voltage across the voltage control device is positive (e.g., when the vehicle is turned off and the battery drains below a threshold voltage), the voltage control device may conduct, allowing the first power voltage to be provided to the vehicle.

At block 308, the voltage control device of the vehicle voltage system may block (e.g., prevent the flow of current) from a third voltage from backfeeding from the vehicle. When the voltage across the voltage control device is negative (e.g., due to the power 107 backfeeding from the vehicle), the voltage control device may prevent the flow of current. Because the voltage control device may be ideal (e.g., forward biased and conductive when the voltage applied to the voltage control device is forward/positive, and non-conductive when the voltage applied to the voltage control device is backward/negative). When the vehicle is running (e.g., the high voltage battery 104 of FIG. 1 and FIG. 2 is providing the power 105), the battery of the vehicle may backfeed (e.g., due to a low impedance), resulting in a negative flow from the third voltage to the voltage control device. As a result, the voltage control device may stop conducting (e.g., acting like an open switch), blocking the backfeeding third voltage.

At block 310, optionally, the system may send vehicle data using a communications interface (e.g., the communications interface 250 of FIG. 2) to another device (e.g., the one or more devices 262 of FIG. 2). The communication interface may use one or more communication protocols such as cellular, Wi-Fi, Bluetooth, LTE, and the like, allowing for wired or wireless communications using the external power supply. For example, the communications interface may allow for offloading data from the vehicle's computer and/or other systems. In particular, the system may send data to one or more devices, such as sensor data for sensors of a sensor system (e.g., the sensor system 210 of FIG. 2), allowing the one or more devices to analyze operational performance of the vehicle and the vehicle's sensor system (e.g., whether the sensors satisfy performance metrics, etc.).

It is understood that the above descriptions are for purposes of illustration and are not meant to be limiting.

Figure 4:
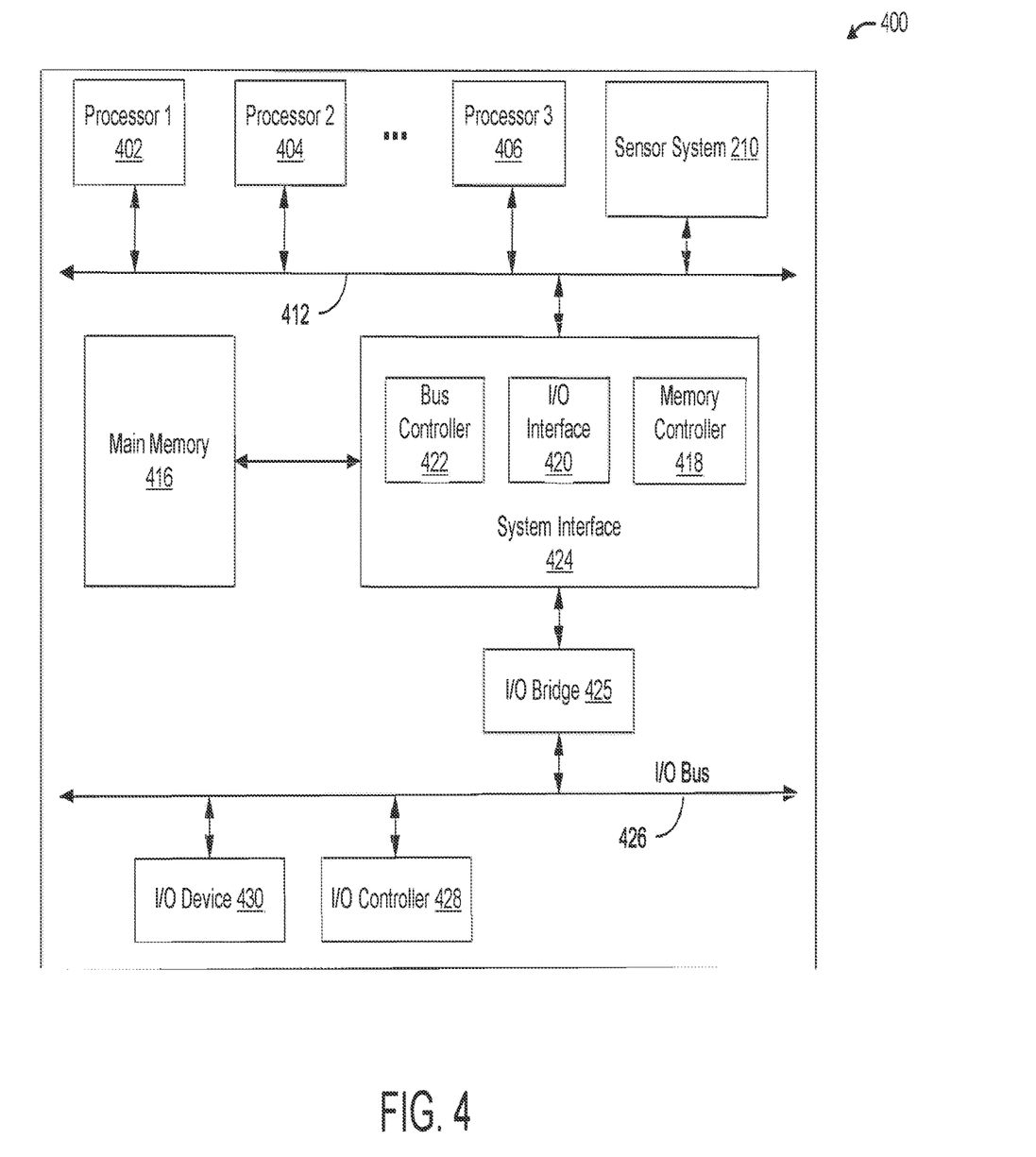
FIG. 4 is a block diagram illustrating an example of a computing device or computer system upon which any of one or more techniques (e.g., methods) may be performed, in accordance with one or more example embodiments of the present disclosure.

FIG. 4 is a block diagram illustrating an example of a computing device or computer system 400 upon which any of one or more techniques (e.g., methods) may be performed, in accordance with one or more example embodiments of the present disclosure.

For example, the computing system 400 of FIG. 4 may represent a portion of or include the sensor system 210 of FIG. 2, and therefore may facilitate the emission, reception, and processing of pulses. The computer system (system) includes one or more processors 402-406. Processors 402-406 may include one or more internal levels of cache (not shown) and a bus controller (e.g., bus controller 422) or bus interface (e.g., I/O interface 420) unit to direct interaction with the processor bus 412. The sensor system 210 of FIG. 2 may also be in communication with the processors 402-406 and may be connected to the processor bus 412, allowing for control of operation of a vehicle that may have or be in communication with the system 400 (e.g., the vehicle 402). For example, data from the sensor system 210 may result in signals (e.g., determined by the one or more processors 232 of the sensor system 210, as shown in FIG. 2, and generated by the system 400) to be sent to vehicle components (e.g., the computer 110 of FIG. 1 and FIG. 2) to control vehicle operation (e.g., velocity, acceleration, direction, etc.).

Processor bus 412, also known as the host bus or the front side bus, may be used to couple the processors 402-406 and/or the sensor system 210 with the system interface 424. System interface 424 may be connected to the processor bus 412 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices 430 with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406 and/or the sensor system 210. Another type of user input device includes cursor control, such as a mouse, a trackball, or cursor direction keys for communicating direction information and command selections to the processors 402-406 and/or the sensor system 210 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406 and/or the sensor system 210. Main memory 416 also may be used for storing temporary variables or other intermediate information during execution of instructions by the processors 402-406 and/or the sensor system 210. System 400 may include read-only memory (ROM) and/or other static storage device coupled to the processor bus 412 for storing static information and instructions for the processors 402-406 and/or the sensor system 210. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 and/or the sensor system 210 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A vehicle voltage system comprising:
a first power supply;
a voltage control device configured to:
receive a first voltage from the first power supply;
provide the first voltage to a low-voltage battery of a battery hybrid electric vehicle;
block a backfeed current from a high-voltage battery of the battery hybrid electric vehicle to the low-voltage battery; and
a communication interface to communicate vehicle sensor data from a computer of the battery hybrid electric vehicle to one or more external computing devices when connected to the first power supply.

2. The vehicle voltage system of claim 1, wherein the voltage control device is further configured to provide the first voltage to the low-voltage battery of the battery hybrid electric vehicle when a second power supply of the battery hybrid electric vehicle is off and when a third voltage of the low-voltage battery of the battery hybrid electric vehicle is below a threshold voltage.

3. The vehicle voltage system of claim 1, wherein the voltage control device is further configured to block the second voltage when a second power supply of the battery hybrid electric vehicle is on.

4. The vehicle voltage system of claim 1, wherein the voltage control device comprises a diode.

5. The vehicle voltage system of claim 1, wherein the voltage control device comprises a relay monitor circuit.

6. The vehicle voltage system of claim 1, wherein the first power supply is a twelve-volt power supply.

7. A method for a battery hybrid electric vehicle, the method comprising:
generating, by a power supply of a vehicle voltage system external to the battery hybrid electric vehicle, a first voltage for a voltage control device of the vehicle voltage system;
providing, from the voltage control device, the first voltage to a low-voltage battery of the battery hybrid electric vehicle;
blocking a backfeed current from a high-voltage battery of the battery hybrid electric vehicle to the low-voltage battery; and
communicating, by a communication interface, vehicle sensor data from a computer of the battery hybrid electric vehicle to one or more external computing devices when connected to the power supply.

8. The method of claim 7, further comprising detecting, by the voltage control device, that a second voltage is below a threshold voltage, wherein providing the first voltage to the low-powered battery of the battery hybrid electric vehicle is based on the detecting.

9. The method of claim 7, wherein the voltage control device comprises a diode.

10. The method of claim 7, wherein the voltage control device comprises a relay monitor circuit.

11. The method of claim 7, wherein the power supply is a twelve-volt power supply.

12. A vehicle voltage system comprising:
a first power supply external to a battery hybrid electric vehicle; and
a voltage control device external to the battery hybrid electric vehicle, the voltage control device configured to:
receive a first voltage from the first power supply;
provide the first voltage to a low-voltage battery of the battery hybrid electric vehicle;
block a backfeed current from a high-voltage battery of the battery hybrid electric vehicle to the low-voltage battery; and
a communication interface to communicate vehicle sensor data from a computer of the battery hybrid electric vehicle to one or more external computing devices when connected to the first power supply.

13. The vehicle voltage system of claim 12, wherein the voltage control device is further configured to provide the first voltage to the low-voltage battery of the battery hybrid electric vehicle when a second power supply of the battery hybrid electric vehicle is off and when a third voltage of the low-voltage battery of the battery hybrid electric vehicle is below a threshold voltage.

14. The vehicle voltage system of claim 12, wherein the voltage control device is further configured to block the second voltage when a second power supply of the battery hybrid electric vehicle is on.

15. The vehicle voltage system of claim 12, wherein the voltage control device comprises a diode.

16. The vehicle voltage system of claim 12, wherein the voltage control device comprises a relay monitor circuit.

17. The vehicle voltage system of claim 12, wherein the first power supply is a twelve-volt power supply.

* * * * *